(12) United States Patent
Madas et al.

(10) Patent No.: US 10,410,521 B2
(45) Date of Patent: Sep. 10, 2019

(54) METHOD FOR DETERMINING AN EVASIVE PATH FOR A HOST VEHICLE

(71) Applicants: Volvo Car Corporation, Gothenburg (SE); Volvo Truck Corporation, Gothenburg (SE)

(72) Inventors: David Madas, Gothenburg (SE); Jonatan Silvlin, Gothenburg (SE); Andreas Eidehall, Molndal (SE); Peter Sundstrom, Gothenburg (SE)

(73) Assignees: Volvo Car Corporation, Gothenburg (SE); Volvo Truck Corporation, Gothenburg (SE)

( * ) Notice: Subject to any disclaimer, the term of this patent is extended or adjusted under 35 U.S.C. 154(b) by 69 days.

(21) Appl. No.: 15/307,955

(22) PCT Filed: May 7, 2015

(86) PCT No.: PCT/EP2015/060082
§ 371 (c)(1),
(2) Date: Oct. 31, 2016

(87) PCT Pub. No.: WO2015/169907
PCT Pub. Date: Nov. 12, 2015

(65) Prior Publication Data
US 2017/0053532 A1 Feb. 23, 2017

(30) Foreign Application Priority Data
May 8, 2014 (EP) .................................... 14167465

(51) Int. Cl.
*G08G 1/16* (2006.01)
*B62D 15/02* (2006.01)
(Continued)

(52) U.S. Cl.
CPC ............. *G08G 1/166* (2013.01); *B60W 10/18* (2013.01); *B60W 10/20* (2013.01); *B60W 30/09* (2013.01);
(Continued)

(58) Field of Classification Search
CPC ....... G08G 1/116; G08G 1/163; B60W 10/18; B60W 10/20; B60W 30/09; B60W 30/095;
(Continued)

(56) References Cited

U.S. PATENT DOCUMENTS 5,892,462 A * 4/1999 Tran ..................... G01C 5/005
340/961
2004/0090117 A1 5/2004 Dudeck et al.
(Continued)

FOREIGN PATENT DOCUMENTS

CN 101636304 A 1/2010
CN 102806912 A 12/2012
(Continued)

OTHER PUBLICATIONS

Chinese Office Action dated Mar. 13, 2018 issued in corresponding Chinese Application No. 201580022035.8.
(Continued)

*Primary Examiner* — Muhammad Shafi
(74) *Attorney, Agent, or Firm* — Harness, Dickey & Pierce, P.L.C.

(57) ABSTRACT

The present invention relates to a method for determining an evasive path for a host vehicle (10), the method i.a. comprising: establishing (S1) a predicted traffic environment (12) of the host vehicle in a time-lateral position domain, the predicted traffic environment comprising an object prediction representation (16) of a traffic object; determining (S2) a start node (24) for the host vehicle; defining (S3) an end
(Continued)

node (26) for the host vehicle; placing (S4) several boundary nodes (28) relative to the object prediction representation; setting (S5) node connections (30, 32, 34a-b, 36a-b, 38, 40, 42) between the start node, the boundary nodes, and the end node; and traversing (S6) the nodes using a graph-search algorithm in order to find a path from the start node to the end time with a lowest cost.

17 Claims, 6 Drawing Sheets

(51) Int. Cl.
  B60W 10/20     (2006.01)
  B60W 30/09     (2012.01)
  B60W 30/095    (2012.01)
  G01C 21/34     (2006.01)
  B60W 10/18     (2012.01)

(52) U.S. Cl.
  CPC ...... *B60W 30/095* (2013.01); *B60W 30/0956* (2013.01); *B62D 15/0265* (2013.01); *G01C 21/3415* (2013.01); *G08G 1/163* (2013.01); *B60W 2550/20* (2013.01); *B60W 2710/18* (2013.01); *B60W 2710/20* (2013.01)

(58) Field of Classification Search
  CPC ........... B60W 30/0956; B62D 15/0265; G01C 21/3415
  USPC ........................................................ 701/117
  See application file for complete search history.

(56) References Cited

U.S. PATENT DOCUMENTS

| | | | |
|---|---|---|---|
| 2005/0125155 A1 | 6/2005 | Kudo | |
| 2005/0192749 A1 | 9/2005 | Flann et al. | |
| 2008/0208408 A1* | 8/2008 | Arbitmann | B60W 10/06 701/41 |
| 2009/0024357 A1* | 1/2009 | Aso | B60W 30/10 702/181 |
| 2009/0143951 A1* | 6/2009 | Takahashi | B60W 30/02 701/70 |
| 2010/0209884 A1* | 8/2010 | Lin | G09B 19/167 434/65 |
| 2010/0209886 A1* | 8/2010 | Lin | B60W 40/09 434/65 |
| 2010/0209889 A1* | 8/2010 | Huang | B60W 40/09 434/65 |
| 2010/0209890 A1* | 8/2010 | Huang | G09B 9/05 434/65 |
| 2010/0211270 A1* | 8/2010 | Chin | B60W 40/09 701/44 |
| 2010/0299121 A1 | 11/2010 | Bond et al. | |
| 2011/0106361 A1 | 5/2011 | Staempfle et al. | |
| 2011/0187515 A1 | 8/2011 | Saito et al. | |
| 2013/0054128 A1 | 2/2013 | Moshchuk et al. | |
| 2013/0249948 A1 | 9/2013 | Reitan | |
| 2014/0063061 A1 | 3/2014 | Reitan | |
| 2014/0303883 A1* | 10/2014 | Aso | B60W 30/10 701/300 |
| 2015/0298621 A1 | 10/2015 | Katoh | |

FOREIGN PATENT DOCUMENTS

| | | |
|---|---|---|
| CN | 102963358 A | 3/2013 |
| DE | 102006042666 A1 | 3/2008 |
| EP | 1990786 A1 | 11/2008 |
| JP | 2006-154967 A | 6/2006 |
| JP | 2012173786 A | 9/2012 |

OTHER PUBLICATIONS

International Search Report PCT/ISA/210 for International Application No. PCT/EP2015/060080 dated Jul. 24, 2015.
Written Opinion of the International Searching Authority PCT/ISA/237 for International Application No. PCT/EP2015/060080 dated Jul. 24, 2015.
Extended European Search Report dated Oct. 24, 2014 issued in corresponding European Application No. 14167465.5.
International Search Report PCT/ISA/210 for International Application No. PCT/EP2015/060082 dated Aug. 31, 2015.
Written Opinion of the International Searching Authority PCT/ISA/237 for International Application No. PCT/EP2015/060082 dated Aug. 31, 2015.
U.S. Office Action dated May 17, 2018 issued in related U.S. Appl. No. 15/305,186.
U.S. Appl. No. 15/305,186, filed Oct. 19, 2016.
U.S. Notice of Allowance dated Jan. 14, 2019 for corresponding U.S. Appl. No. 15/305,186.
U.S. Notice of Allowance dated May 31, 2019 for corresponding U.S. Appl. No. 15/305,186.

* cited by examiner

METHOD FOR DETERMINING AN EVASIVE PATH FOR A HOST VEHICLE

CROSS-REFERENCE TO RELATED APPLICATIONS

This application is a national phase under 35 U.S.C. § 371 of PCT International Application No. PCT/EP2015/060082 which has an International filing date of May 7, 2015, which claims priority to European Application No. 14167465.5, filed May 8, 2014, the entire contents of which are hereby incorporated by reference.

TECHNICAL FIELD

The present invention relates to a method for determining an evasive path for a host vehicle. The present invention also relates to a corresponding computer program product. The present invention also relates to a vehicle.

BACKGROUND OF THE INVENTION

While vehicles have been developed to be progressively safer through decades of improved mechanical structures and materials traffic accidents still do occur. Whether it is by human error, external factors or material failure there is has been a need to take a more proactive approach to complement the passive safety arrangements. Developments in the electronics field have provided new smaller, precise and more cost efficient sensors, data processors and data communication means that allow systems that can actively detect and interpret a traffic situation. Accordingly, one system may provide the driver with a warning message to call the attention of the driver to the drifting out of lane, or a system may brake autonomously. However, current advanced driver assistance systems used in for instance auto braking and lane keeping aid functions are commonly scenario-specific. For example, an automatic brake function for intersection may use a completely different algorithm than an automatic brake function for freeway driving. This is inefficient from a data processing perspective in terms of the whole vehicle and from a development cost perspective. Furthermore, this counteracts development of new functionality as multiple algorithms have to be maintained and extended for the life time of a vehicle platform.

Hence, there exists a need for a method that may take a more holistic interpretation of a traffic environment and which provides input data to e.g. the different warning interfaces and/or the controlling systems for collision avoidance or collision mitigation in vehicles.

Furthermore, US2005/0192749 (Flann et al.) discloses a path planner and a method for determining a path for a vehicle comprises defining a starting point for the vehicle. A termination point is defined. An obstacle detector detects one or more obstacles in a work area between the starting point and the termination point. A boundary zone is defined about each corresponding obstacle. Candidate paths are identified between the starting point and the termination point. Each candidate path only intersects each boundary zone once for each corresponding obstacle. An economic cost is estimated for traversing each candidate path or a portion thereof between the starting point and the termination point. A preferential path is selected from the identified candidate paths based on the preferential path being associated with a lowest estimated economic cost.

SUMMARY OF THE INVENTION

It is an object of the present invention to provide an improved method for determining an evasive path for a host vehicle.

According to a first aspect of the present invention, there is provided a method for determining an evasive path for a host vehicle, the method comprising: establishing a predicted traffic environment of the host vehicle in a time-lateral position domain, the predicted traffic environment comprising an object prediction representation of a traffic object; determining a start node for the host vehicle, the start node representing a start time and a start lateral position in the predicted traffic environment; defining an end node for the host vehicle, the end node representing an end time in the predicted traffic environment; placing several boundary nodes relative to the object prediction representation in the predicted traffic environment between the start node and the end node; setting node connections between the start node, the boundary nodes, and the end node, thereby defining a connectivity map with possible node connections in the predicted traffic environment; and traversing the nodes using a graph-search algorithm in order to find a path from the start node to the end node with a lowest cost, whereby the path with the lowest The lowest cost may be the lowest cost of maximum lateral jerk. Alternatively, maximum lateral acceleration or sum of lateral movement could be used as cost function.

Said node connections may include splines. Each spline may have a piecewise constant magnitude of lateral jerk.

Any lateral motion at the end of a node connection may be carried over to the start of a subsequent node connection.

Any node connections passing through the object prediction representation may be disregarded when traversing the nodes.

The object prediction representation of the traffic object may include a set of points connected by straight lines, wherein each boundary node is placed a predetermined lateral distance from a respective corner of the object prediction representation. The predetermined lateral distance may be half the width of the host vehicle and an additional predetermined safety margin.

The predetermined safety margin may be in the range of 0-1 meter, or in the range of 0-0.5 m, or in the range of 0-0.3 m. The safety margin may compensate for example accuracy, precision or sampling rate of for example sensors and may be adapted based on predetermined or calibrated parameters depending on type or model of sensor.

Furthermore, the predetermined safety margin may be negative. The predetermined safety margin may be determined so that the predetermined lateral distance is in the range of 0.1-1 m, or in the range of 0.1-0.5 m, or in the range of 0.1-0.3 m. For example, for a lateral distance of 0.2 m and a host vehicle width of 2 m, the predetermined safety margin may be determined as 0.2−2/2=−0.8 m. The negative safety margin may for example be advantageous in a situation where the traffic object is detected to be adjacent to another traffic object so that a positive predetermined safety margin would result in a collision with a boundary node of the other traffic object or with the other traffic object itself. For example, for determination of a predetermined safety margin between two traffic objects, the predetermined safety margin may be determined so that the predetermined lateral distance may be less than half the width of the host vehicle.

The method further may further comprise: giving each boundary node at least one boundary condition, such as required lateral velocity, tolerance in lateral position, and/or tolerance in time.

The graph-search algorithm may be an A* search algorithm.

The method may further comprise: providing a control signal to an automatic steering system and/or automatic braking system of the host vehicle based on the selected evasive path.

The method may further comprise: providing a risk assessment output signal based on the selected evasive path.

According to a second aspect of the present invention, there is provided a computer program product comprising code configured to, when executed by a processor or an electronic control unit, perform the method according to any one of the preceding claims. This aspects may exhibit the same or similar feature and/technical effects as the first aspect. The code may be stored on a computer readable medium.

According to a third aspect of the present invention, there is provided vehicle comprising an electronic control unit configured to perform the method according to the first aspect. This aspects may exhibit the same or similar feature and/technical effects as the first and second aspects. The electronic control unit may further be configured to provide a control signal based on the selected evasive path, wherein the vehicle further comprises an active safety system adapted to automatically control the vehicle based on said control signal.

Further features of, and advantages with, the present invention will become apparent when studying the appended claims and the following description. The skilled addressee realize that different features of the present invention may be combined to create embodiments other than those described in the following, without departing from the scope of the present invention.

BRIEF DESCRIPTION OF THE DRAWINGS

These and other aspects of the present invention will now be described in more detail, with reference to the appended drawings showing exemplary embodiments of the present invention, in which.

DESCRIPTION OF EXEMPLARY EMBODIMENTS

Figure 1:
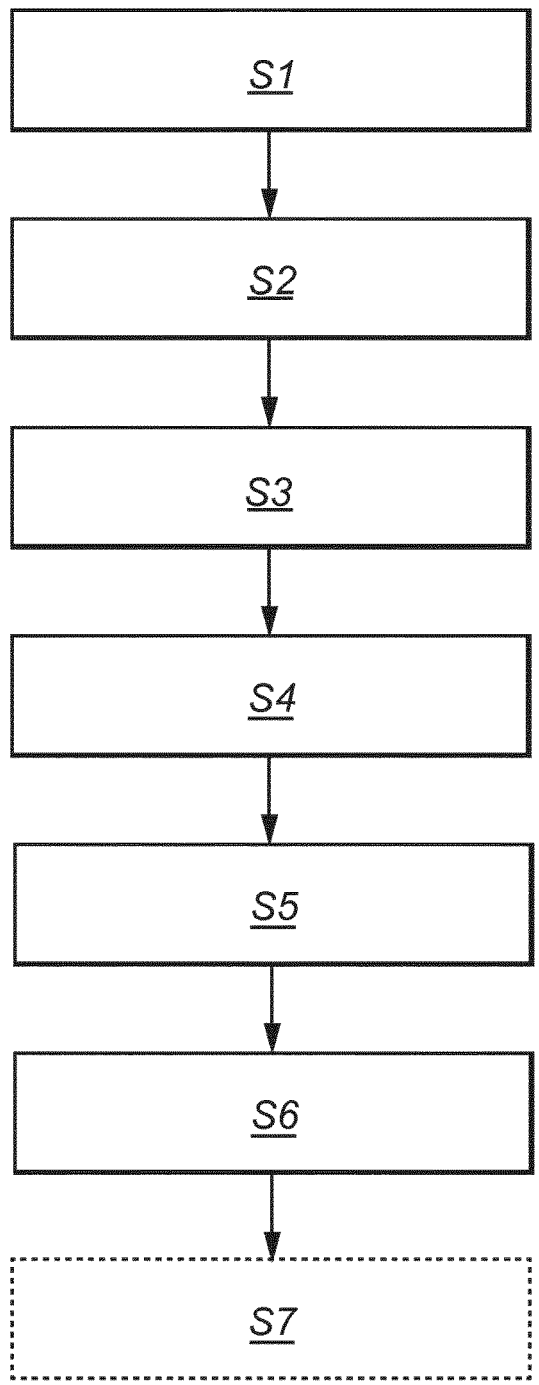
FIG. 1 is a flowchart of a method for determining an evasive path for a host vehicle.

The present invention will now be described more fully hereinafter with reference to the accompanying drawings, in which exemplary embodiments of the invention are shown. This invention may, however, be embodied in many different forms and should not be construed as limited to the embodiments set forth herein; rather, these embodiments are provided for thoroughness and completeness, and fully convey the scope of the invention to the skilled addressee. Like reference characters refer to like elements throughout.

FIG. 1 is a flowchart of a method for determining an evasive path for a host vehicle.

Figure 2A:
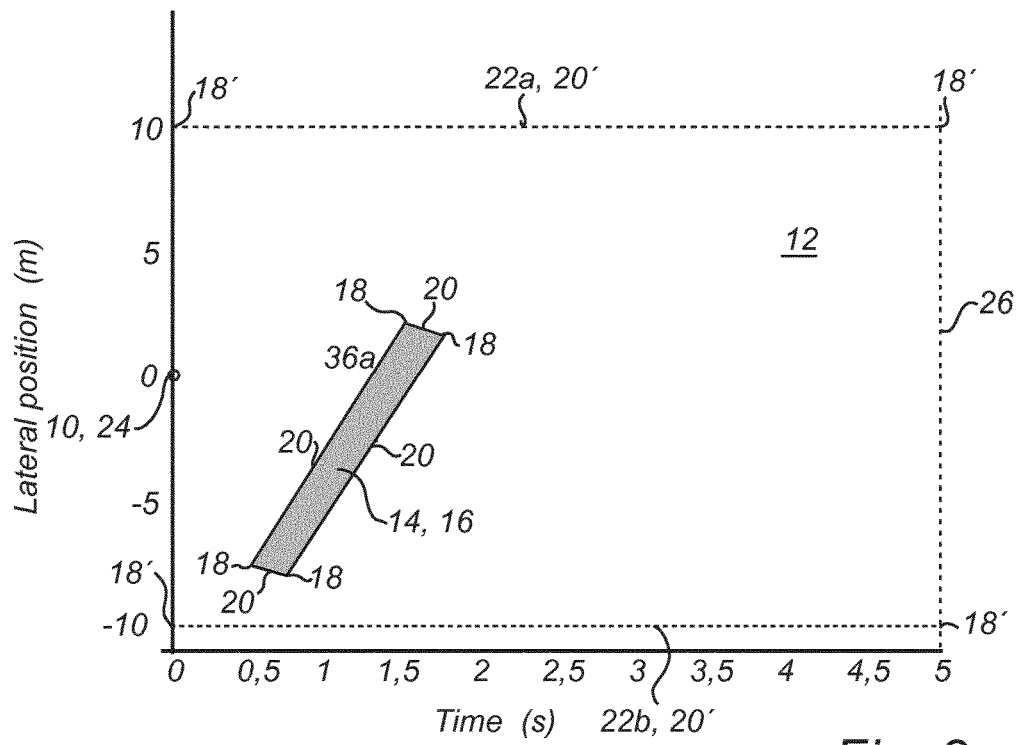
FIGS. 2a-b show a predicted traffic environment in a time-lateral position domain.
Figure 2B:
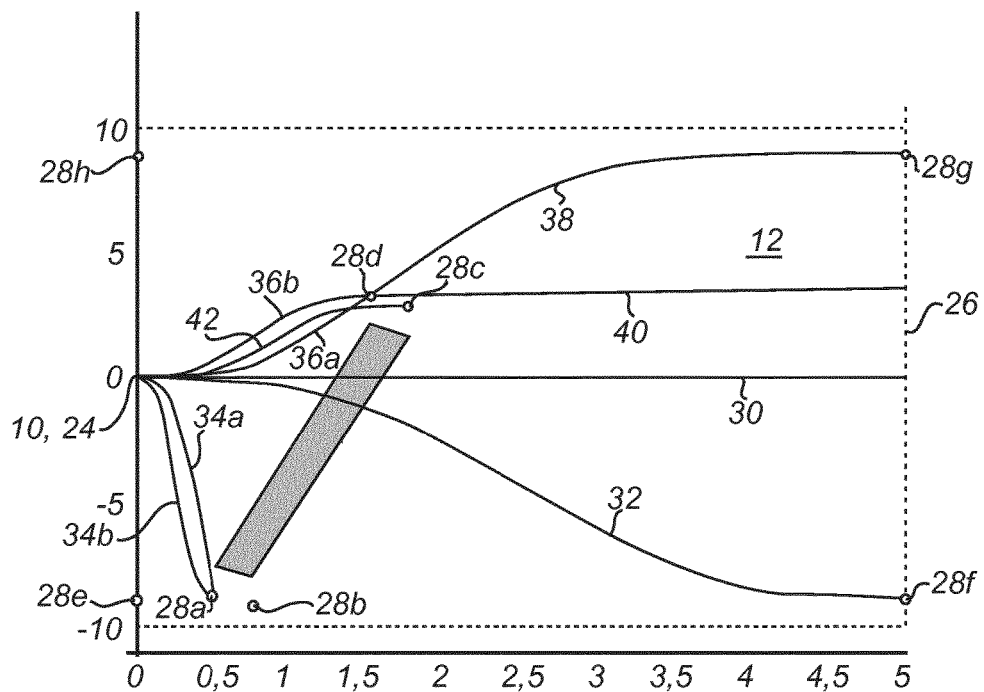

In step S1, a predicted traffic environment 12 for the host vehicle 10 is established in a time-lateral position domain t-y, see FIGS. 2a-b. The predicted traffic environment 12 comprises a traffic object 14. The traffic object 14 is moving. The traffic object 14 may for example be another vehicle. The traffic object 14 is represented in the time-lateral position domain by an object prediction representation 16. The object prediction representation 16 of the traffic object 14 includes a set of points 18 connected by straight lines 20, here resulting in a parallelogram-shaped object prediction representation 16.

Figure 6A:
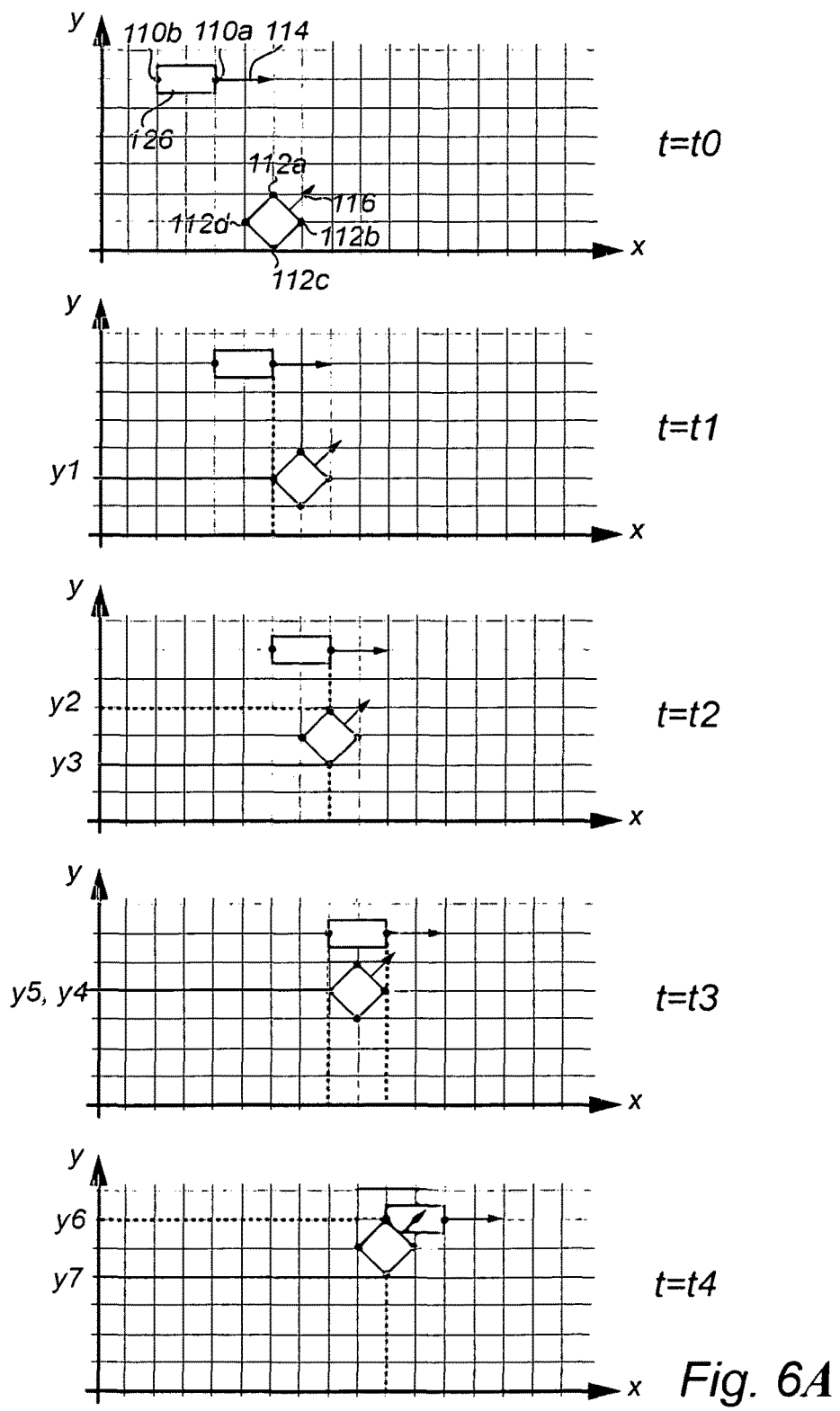
FIGS. 6A-6B illustrate an exemplary scenario for a method for providing an object prediction representation.
Figure 6B:
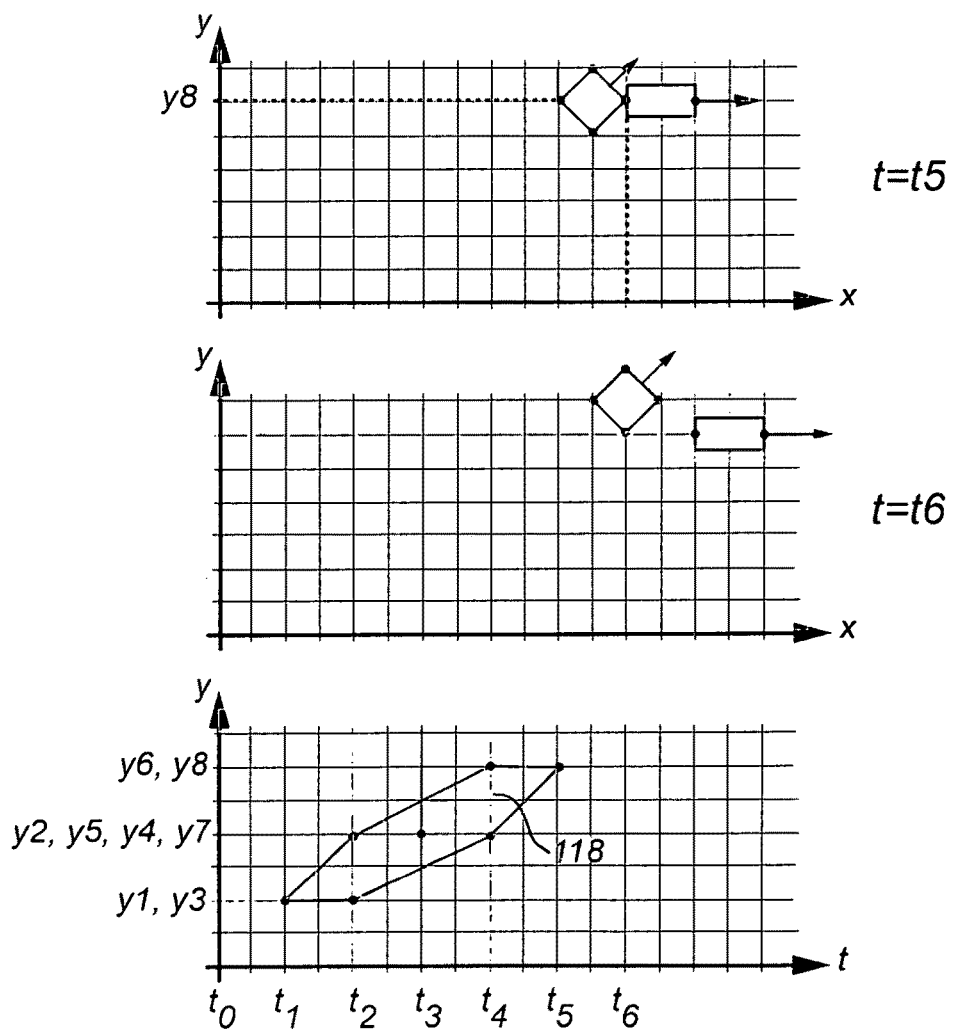

An exemplary way to determining the object prediction representation is disclosed in applicant's co-pending patent application entitled "METHOD FOR PROVIDING AN OBJECT PREDICTION REPRESENTATION", the contents of which herein is incorporated by reference. The method disclosed in "METHOD FOR PROVIDING AN OBJECT PREDICTION REPRESENTATION" comprises: establishing host vehicle 126 in a longitudinal-lateral coordinate system at a starting time t0, the host vehicle being represented by at least one reference point 110a, 110b in the coordinate system; detecting an object, and establishing the object in the coordinate system at the starting time t0, the object being represented by a plurality of object reference points 112a-d along the perimeter of the object, wherein movement of the object is determined; simulating movement of the host vehicle and the object in the longitudinal-lateral coordinate system based on their initial positions at the starting time t0 and a (longitudinal) movement 114 of the host vehicle and the determined movement 116 of the object, wherein points in time t0–n when the at least one reference point of the host vehicle and an object reference point of the plurality of object reference points have the same longitudinal position are detected, and wherein for each detected point in time an associated lateral position y1–n of the object reference point at the detected point in time is detected; and establishing the object prediction representation 118 in a time-lateral domain based on the detected points in time and the associated lateral positions. FIGS. 6A-6B show an exemplary scenario using the method for providing the object prediction representation.

Returning to FIGS. 1 and 2a-b, the traffic object 14 may be detected using external sensors, such as cameras and/or radar sensors, on the host vehicle 10, and the object prediction representation 16 may be determined using the host vehicle's electronic control unit (ECU).

The predicted traffic environment 10 further comprises two additional traffic object 22a-b. The two additional traffic objects may be stationary. In the present example, the two additional traffic object 22a-b are lane markings. Each lane marking may be represented by two points 18' connected by a straight line 20'.

In step S2, a start node 24 of the host vehicle 10 in the predicted traffic environment 12 is determined, based on its initial position relative to the traffic object. The start node 24 has host vehicle initial conditions. Specifically, the start node 24 has a start time and a start lateral position, which in the time-lateral position domain of FIG. 2a-b coincides with origin. The start node 24 may also have at least one additional condition, such as an initial lateral motion. But in the present example the initial lateral motion is zero.

In step S3, an end node 26 of the host vehicle 10 in the predicted traffic environment 12 is defined. The end node 26 has desired end conditions. Specifically, the end node 26 may have an end time, but no pre-defined end lateral position. In other words, the end node 26 has a tolerance in lateral position. The end lateral position is up for the present method to determine. In the present example the end time is five seconds.

In step S4, several boundary nodes 28*a-d* are placed around the object prediction representation 16, see FIG. 2*b*. Each boundary node 28*a-d* is placed a predetermined lateral distance from a respective corner of the object prediction representation 16, as illustrated in FIG. 2*b*. The predetermined lateral distance may be half the width of the host vehicle plus a predetermined safety margin. Likewise, boundary nodes 28*e-h* may be placed the predetermined lateral distance from the points 18 indicating the lane markings. Basically, boundary nodes can be created for any type of object that can be represented by a set of points, connected by straight lines, in the t-y space. This flexibility in input makes the present method suitable for a plurality of functions and applications. Each boundary node 28*a-h* may also have at least one boundary condition, such as a required lateral velocity, tolerance in lateral (y) position, tolerance in time, etc. The at least one boundary conditions may affect node connections to and/or from the boundary nodes, see further below.

In step S5, various node connections are set between the start node 24, the boundary nodes 28*a-h*, and the end node 26. For example, one node connection is a straight horizontal line 30 in the time-lateral position domain going directly from the start node 24 to the end node 26. Other node connections may be splines. A spline is a smooth polynomial function, and the spline may consist of one or more segments. For example, the node connection between the start node 24 and the boundary node 28*f* of the lower lane marking may be a spline 32. Between the start node 24 and the boundary node 28*a* of the object prediction representation 16, there may be two splines 34*a* and 34*b*. Spline 34*a* is open-state, and spline 34*b* is closed-state, as will be explained further below. Likewise, there is both an open-state spline 36*a* and a closed-state spline 36*b* between the start node 24 and boundary node 28*d*. There may also be a subsequent node connection 38 from boundary node 28*d* to boundary node 28*g* of the upper lane marking. The node connection 38 is also a spline, and 36*a* and 38 together make up a complete path. There could also be a straight node connection 40 from the boundary node 28*d* to the end node 26. There may also be a node connection/spline 42 from the start node 24 to the boundary node 28*c*. The node connections 30,32,34*a-b*,36*a-b*,38,40,42 define a connectivity map for the predicted traffic environment 12.

There may also be rules, applicable to different traffic problems, which rules ensure that some node connections are not set in the connectivity map, though they might be theoretically possible. This reduces the search space and ensures quicker processing in the next step S6. Examples of such rules include: no node connections backwards in time, no node connections from a stationary object to a moving object, no node connections between two boundary nodes of the same moving object, etc.

Figure 3:
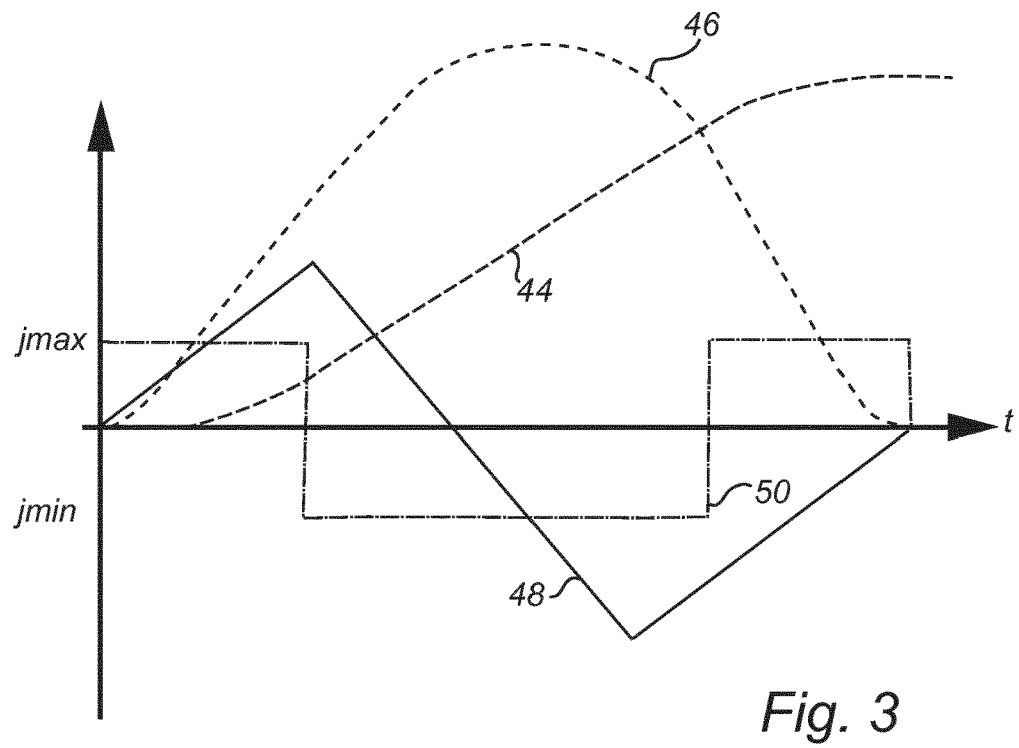
FIG. 3 shows an exemplary closed spline and the associated position, velocity, acceleration and jerk.
Figure 4:
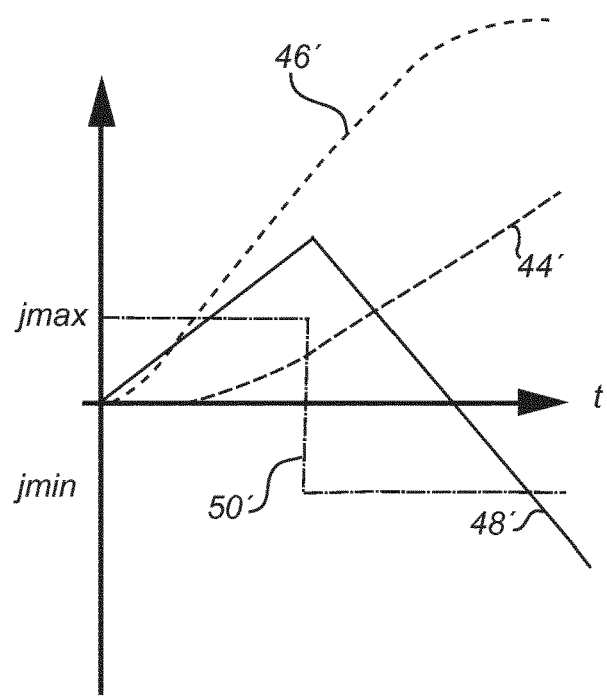
FIG. 4 shows an exemplary open spline and the associated position, velocity, acceleration and jerk.

Further, each spline may have piecewise constant magnitude of lateral jerk, see FIGS. 3-4. Jerk is defined as the rate of change of acceleration. That is, the derivative of acceleration with respect to time, the second derivative of velocity, or the third derivative of position. This is illustrated in FIG. 3, which shows position 44, velocity 46, acceleration 48 and jerk 50 for a spline 44 over time, wherein $j_{max}=|J_{min}|$. The spline 44 ends with a lateral motion equal to zero (velocity=0), whereby it is designated as closed-state, like splines 34*b* and 36*b* in FIG. 2*b*. FIG. 4 shows position 44', velocity 46', acceleration 48' and jerk 50' for another spline 44' over time, wherein $j_{max}=|j_{min}|$, albeit the value may be different than in FIG. 3. The spline 44' ends with a lateral motion other than zero (velocity ≠ 0), whereby it is designated as open-state, like splines 34*a* and 36*a* in FIG. 2.

Whether a spline is closed-state or open-state may be governed by the boundary condition(s) of the boundary node in question. For example, in FIG. 2*b* boundary node 28*c* may have a boundary condition that required lateral velocity is zero, whereby spline 42 becomes closed-state. Further, boundary node 28*d* may not have any required lateral velocity, whereby both closed-state spline 36*b* and open-state spline 36*a* can be set. Open-state node connections are typically only used for the closest traffic object, and more specifically for the closest boundary nodes of the closest traffic object, for example boundary nodes 28*a* and 28*d* for traffic object 14.

The boundary condition may also affect the number of segments of the spline. For example, spline 36*b* has more segments than spline 36*a*. Consequently, if boundary node 28*d* had a required lateral velocity not equal to zero resulting in that only open-state spline 36*a* could be set, that would mean fewer segments than if boundary node 28*d* had a required lateral velocity equal to zero resulting in that only closed-state spline 36*b* could be set.

Furthermore, boundary node 28*g* could be a line node, which has a tolerance in time (boundary condition), whereby spline 38 could be designated as line-state. A line node may be placed wherever the distance in time between two points of an object exceeds a certain threshold. Hence, line-state splines may be used for long traffic objects, such as the lane markings 22*a-b*, or a moving traffic objects that extend over a long time. A line-state spline aims to become tangential to the traffic object, whereby the lateral velocity and acceleration (boundary conditions) of the corresponding line node may be fixed.

It is also noted in FIG. 2*b* that any lateral motion at the end of a node connection is carried over to the start of a subsequent node connection. For example, the end of spline 36*a* at boundary node 28*d* has the same lateral motion as the beginning of the subsequent spline 38 leaving boundary node 28*d*.

Returning to FIG. 1, in step S6 the nodes of the connectivity map are traversed using a graph-search algorithm, in order to reach the end time with the objective of minimizing a cost function, for example maximum lateral jerk. The path (i.e. the node connection or interconnected node connections) between the start node 24 and the end node 26 which has the lowest maximum lateral jerk and which avoids collision with the objects 14 and 22*a-b* is then selected as the evasive path for the host vehicle 10. Using a graph-search algorithm ensures that the end time is quickly reached, whereby the most suitable path can be found without having to traverse all possible paths/node connections. An A* search algorithm may for example be used. However, also other graph search algorithms may be used. Furthermore, instead of maximum lateral jerk, maximum lateral acceleration or sum of lateral movement could be used as the cost function, for example.

In the present example of FIG. 2*b*, node connections 30 and 32 are disregarded as they pass through the object predictions representation 16. Node connection 42 may also be disregarded since it passes inside the boundary node 28*d*. Further, there is no point in continue with node connection 34*a* from boundary point 28*a* since a boundary condition of lateral velocity is likely violated given the lower lane marking. Roughly speaking, should the host vehicle 10 take this path it may end up crossing the lane marking. There is no point in continue with node connection 34b from boundary point 28a since the maximum lateral jerk appears indeed higher than for node connections 36a-b. Turning then to node connections 36a-b, node connection 36a can continue with node connection 38 and reach the end node 26 node without colliding with any of the objects 14 and 22a-b. Likewise connection 36b could continue with node connection 40 and also reach the end node 36 without collision. However, the graph-search algorithm here selects node connections 36a+38 as the evasive path, since the maximum lateral jerk for path 36a+38 is lower than for path 36b+40. In particular, the closed-state node connection 36b requires some more turning of the host vehicle 10 than open-state node connection 36a. However, if the upper/left lane marking is moved closer to the host vehicle 10, the end time of node connection 38 will move backwards, and the path 36b+40 will eventually become the lowest cost path.

In an optional step S7, a control signal to an active safety system, such as an automatic steering system 52 and/or automatic braking system 54 (see FIG. 5), of the host vehicle 10 based on the selected evasive path may be provided. In this way, the host vehicle 10 may automatically follow the selected evasive path. Alternatively, a risk assessment output signal based on the selected evasive path may be provided. For example, for auto braking applications, the lateral threat (severity of the lateral escape path) may be used as a trigger condition. This threat is found from evaluating the generated escape path (finding maximum lateral acceleration/jerk). Since the generated escape path has a high fidelity (it is has a smooth, steerable characteristic), the threat given will be a good approximation of what a driver would be able to do in the given situation.

Figure 5:
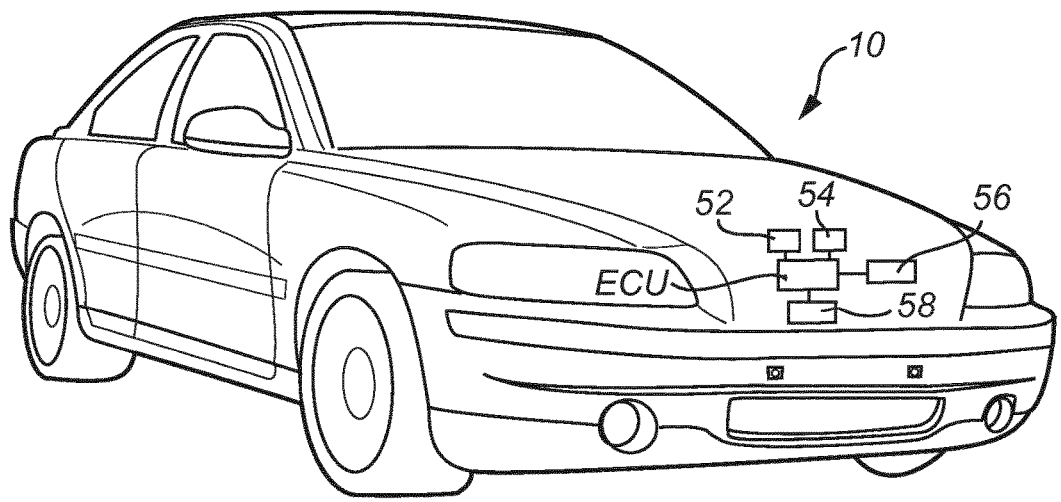
FIG. 5 is a schematic view of a vehicle.

The present method may be embodied in a computer program product 56 comprising code configured to, when executed by a processor or the ECU, perform the method. The code may be stored on a computer readable medium (not shown). The ECU may in turn be arranged in the host vehicle 10, as illustrated in FIG. 5. The host vehicle 10 may for example be a car or a truck or a bus. The host vehicle 10 may be an autonomous vehicle. The aforementioned external sensors, such as cameras and/or radar sensors, are designated by reference sign 58 in FIG. 5.

Furthermore, the method present is completely deterministic (requires no stochastic optimization) and is therefore quick and well suited for implementation in production vehicles. Additionally, it can handle any type of object, moving or static, as long as a faithful representation can be done with the proposed object representation (a set of points connected by straight lines in t-y space).

Furthermore, even though only one moving traffic object has been shown in FIG. 2, the present method may also determine an evasive path for the host vehicle in a predicted traffic environment with several moving traffic objects.

Even though the invention has been described with reference to specific exemplifying embodiments thereof, many different alterations, modifications and the like will become apparent for those skilled in the art. Variations to the disclosed embodiments can be understood and effected by the skilled addressee in practicing the claimed invention, from a study of the drawings, the disclosure, and the appended claims.

Furthermore, in the claims, the word "comprising" does not exclude other elements or steps, and the indefinite article "a" or "an" does not exclude a plurality.

The invention claimed is:

1. A method, comprising:
   detecting a traffic object that is external to a host vehicle in an external environment vehicle by one or more sensors of the host vehicle; and
   causing a processor of the host vehicle or an electronic control unit of the host vehicle to, in response to the detecting of the traffic object by the one or more sensors, perform the steps of:
   establishing a predicted traffic environment of the host vehicle in a time-lateral position domain, the predicted traffic environment comprising an object prediction representation of the traffic object,
   determining a start node for the host vehicle, the start node representing a start time and a start lateral position in the predicted traffic environment,
   defining an end node for the host vehicle, the end node representing an end time in the predicted traffic environment,
   placing several boundary nodes relative to the object prediction representation in the predicted traffic environment between the start node and the end node, wherein the object prediction representation of the traffic object includes a set of points connected by straight lines in the time-lateral position domain, and wherein each boundary node is placed a predetermined lateral distance from a respective corner of the object prediction representation,
   setting node connections between the start node, the boundary nodes, and the end node, thereby defining a connectivity map with possible node connections in the predicted traffic environment, and
   traversing the start node, the boundary nodes, and the end node using a graph-search algorithm in order to find a path from the start node to the end node with a lowest cost, whereby the path with the lowest cost is selected as an evasive path associated with the host vehicle, wherein the lowest cost is a lowest cost of maximum lateral jerk, a lowest cost of maximum lateral acceleration, or a lowest cost of a sum of lateral movement.

2. The method according to claim 1, wherein said node connections include splines.

3. The method according to claim 1, wherein each spline has a piecewise constant magnitude of lateral jerk.

4. The method according to claim 1, wherein any lateral motion at an end of a node connection is carried over to a start of a subsequent node connection.

5. The method according to claim 1, wherein any node connections passing through the object prediction representation are disregarded when traversing the start node, the boundary nodes, and the end node.

6. The method of claim 1, wherein the predetermined lateral distance is half the width of the host vehicle and an additional predetermined safety margin.

7. The method of claim 6, wherein the predetermined safety margin is in a range of 0-1 m.

8. The method according to claim 1, wherein the placing the several boundary nodes includes giving each boundary node at least one boundary condition.

9. The method of claim 8, wherein the at least one boundary condition is selected from the group comprising: required lateral velocity, tolerance in lateral position, and tolerance in time.

10. The method according to claim 1, wherein the graph-search algorithm is an A* search algorithm.

11. The method according to claim 1, further comprising:
causing the processor of the host vehicle or the electronic control unit of the host vehicle to transmit a risk assessment output signal based on the selected evasive path.

12. The method of claim 1, further comprising:
transmitting a control signal to an active safety system of the host vehicle based on the selected evasive path, the active safety system including an automatic steering system and/or an automatic braking system, the active safety system configured to cause the host vehicle to automatically move along a particular path, and
causing the active safety system to, in response to the control signal, cause the host vehicle to automatically follow the selected evasive path through the external environment.

13. A non-transitory computer program product comprising code configured to, when executed by a processor or an electronic control unit, perform a method, the method comprising:
establishing a predicted traffic environment of a host vehicle in a time-lateral position domain;
establishing an object prediction representation of a traffic object in the predicted traffic environment based on detection of the traffic object in an external environment by one or more sensors of the host vehicle, the traffic object and the external environment being external to the host vehicle,
determining a start node associated with the host vehicle in the predicted traffic environment, the start node representing a start time and a start lateral position in the predicted traffic environment,
defining an end node associated with the host vehicle, the end node representing an end time in the predicted traffic environment,
establishing a plurality of boundary nodes relative to the object prediction representation in the predicted traffic environment between the start node and the end node, wherein the object prediction representation of the traffic object includes a set of points connected by straight lines in the time-lateral position domain, and wherein each boundary node is placed a particular lateral distance from a respective corner of the object prediction representation;
setting node connections between the start node, the boundary nodes, and the end node, thereby defining a connectivity map with possible node connections in the predicted traffic environment, and
traversing the start node, the boundary nodes, and the end node using a graph-search algorithm in order to find a path from the start node to the end node that is associated with a lowest cost, whereby the path with the lowest cost is selected as an evasive path associated with the host vehicle, wherein the lowest cost is a lowest cost of maximum lateral jerk, a lowest cost of maximum lateral acceleration, or a lowest cost of a sum of lateral movement.

14. The computer program product according to claim 13, wherein the code is stored on a computer readable medium.

15. The non-transitory computer program product of claim 13, the method further comprising:
transmitting a control signal to an active safety system of the host vehicle based on the selected evasive path to cause the active safety system to cause the host vehicle to automatically follow the selected evasive path through the external environment based on the control signal, the active safety system of the host vehicle including an automatic steering system and/or an automatic braking system.

16. A vehicle comprising:
one or more sensors configured to detect a traffic object that is external to the vehicle in an external environment that is external to the vehicle; and
an electronic control unit configured to:
establish a predicted traffic environment of the vehicle in a time-lateral position domain,
establish an object prediction representation of the traffic object in the predicted traffic environment based on the detection of the traffic object by the one or more sensors,
determine a start node associated with the vehicle in the predicted traffic environment, the start node representing a start time and a start lateral position in the predicted traffic environment,
define an end node associated with the vehicle, the end node representing an end time in the predicted traffic environment,
establish a plurality of boundary nodes relative to the object prediction representation in the predicted traffic environment between the start node and the end node, wherein the object prediction representation of the traffic object includes a set of points connected by straight lines in the time-lateral position domain, and wherein each boundary node is placed a particular lateral distance from a respective corner of the object prediction representation;
set node connections between the start node, the boundary nodes, and the end node, thereby defining a connectivity map with possible node connections in the predicted traffic environment, and
traverse the start node, the boundary nodes, and the end node using a graph-search algorithm in order to find a path from the start node to the end node that is associated with a lowest cost, whereby the path with the lowest cost is selected as an evasive path associated with the vehicle, wherein the lowest cost is a lowest cost of maximum lateral jerk, a lowest cost of maximum lateral acceleration, or a lowest cost of a sum of lateral movement.

17. The vehicle of claim 16, further comprising:
an active safety system including an automatic steering system and/or an automatic braking system, the active safety system configured to cause the vehicle to automatically move along a particular path,
wherein the electronic control unit is further configured to transmit a control signal to the active safety system based on the selected evasive path,
wherein the active safety system is further configured to cause the vehicle to automatically follow the selected evasive path through the external environment based on the control signal.

* * * * *